United States Patent [19]
Benoist

[11] Patent Number: 5,658,036
[45] Date of Patent: Aug. 19, 1997

[54] FUEL PORT SEALING APPARATUS

[76] Inventor: Noel Benoist, 633 S. Hilton, Apache Junction, Ariz. 85219

[21] Appl. No.: 510,480

[22] Filed: Aug. 2, 1995

[51] Int. Cl.$^6$ .................................................. B60K 15/05
[52] U.S. Cl. .............. 296/97.22; 220/86.2; 220/DIG. 33
[58] Field of Search ..................... 296/97.22; 220/86.2, 220/DIG. 33

[56] References Cited

U.S. PATENT DOCUMENTS

| | | | |
|---|---|---|---|
| 2,294,190 | 8/1942 | Lee | 220/86.2 |
| 2,314,710 | 3/1943 | Keller | 296/97.22 X |
| 3,374,007 | 3/1968 | Ingolia | 296/97.22 X |
| 4,579,244 | 4/1986 | Fukuta | 220/DIG. 33 X |
| 5,072,986 | 12/1991 | Tai et al. | 296/97.22 |
| 5,533,766 | 7/1996 | Farber | 296/97.22 X |

*Primary Examiner*—Dennis H. Pedder
*Attorney, Agent, or Firm*—Parsons & Goltry; Robert A. Parsons; Michael W. Goltry

[57] ABSTRACT

A fuel port sealing apparatus for closing and sealing a fuel port carried within a recessed chamber of a body of a vehicle. The sealing apparatus includes an access door having an edge hingedly coupled to the body adjacent the recessed chamber and movable between an open position and a closed position, and a sealing member coupled to the access door and orientable to match the tilt of the fuel port as the access door is closed.

9 Claims, 3 Drawing Sheets

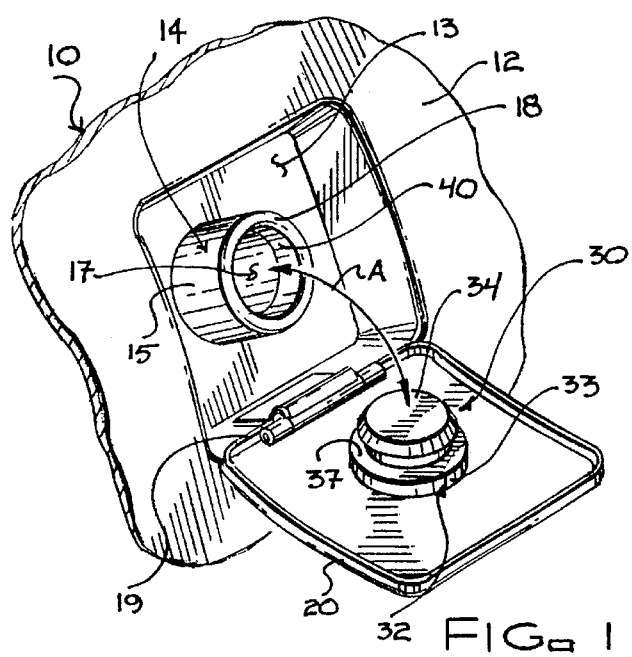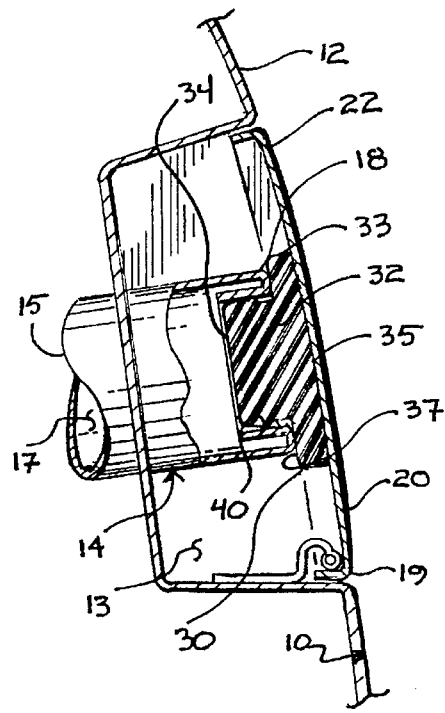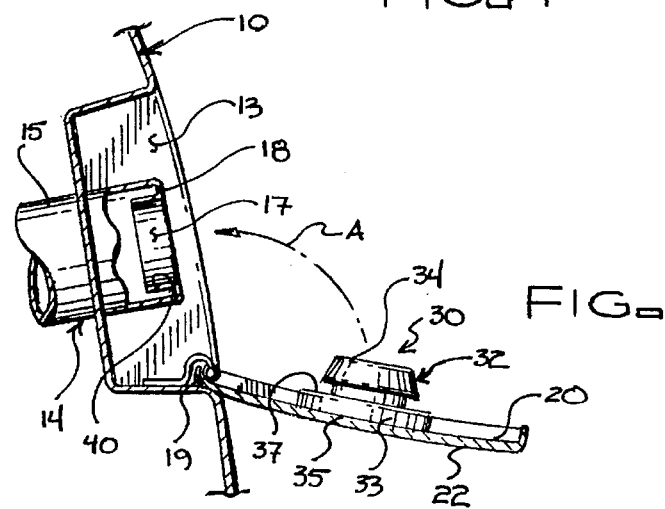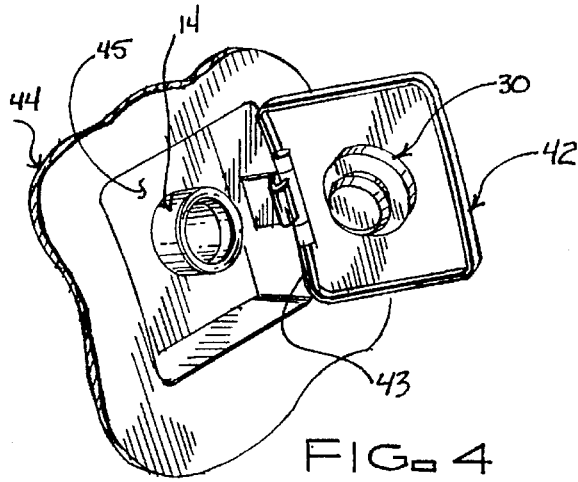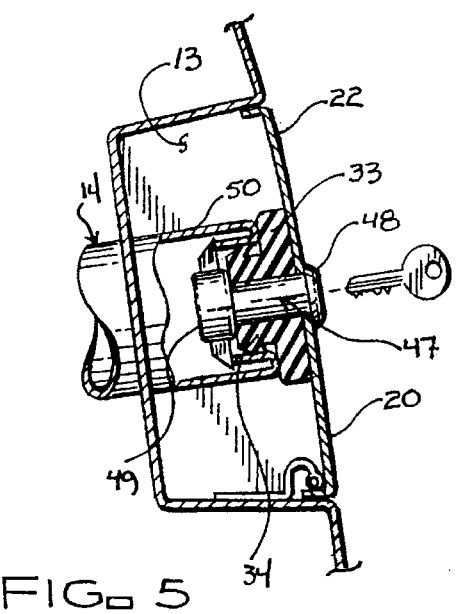

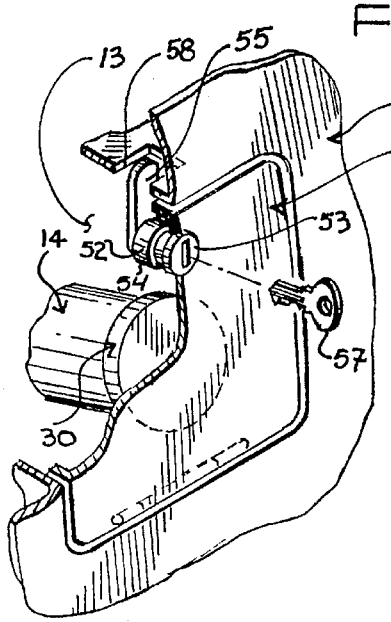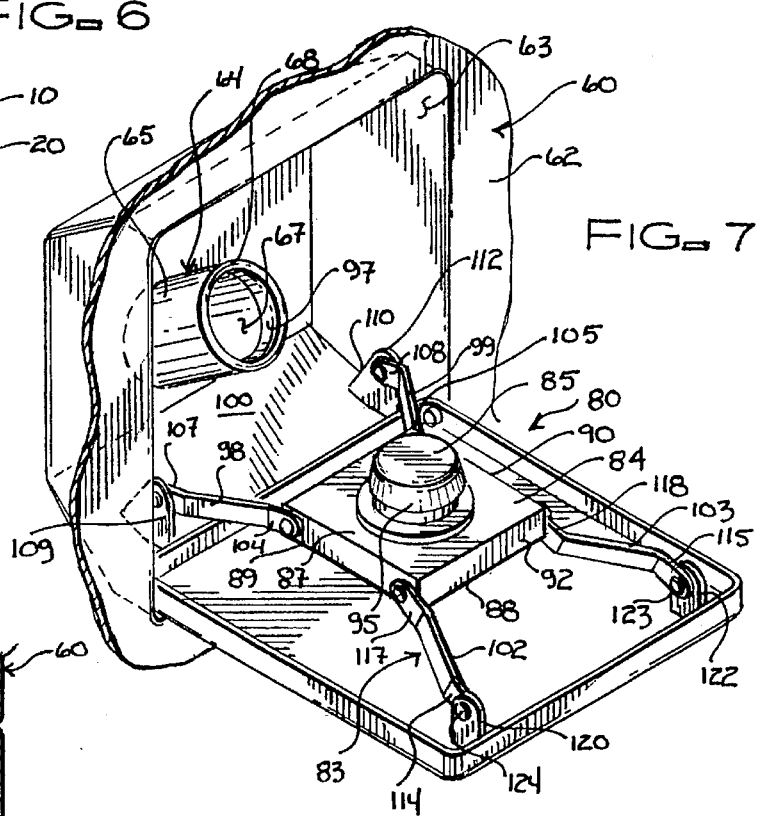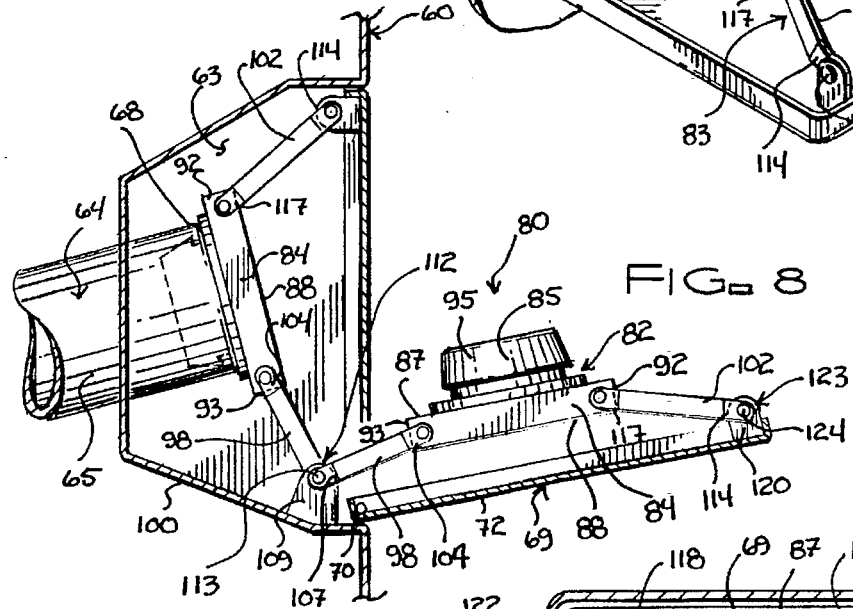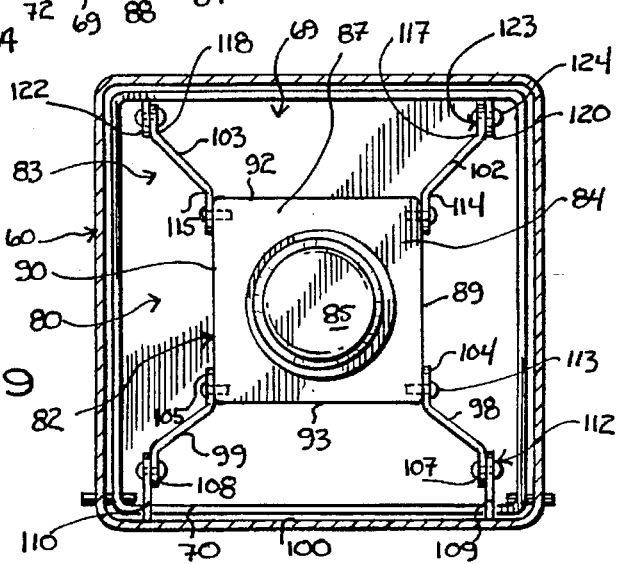

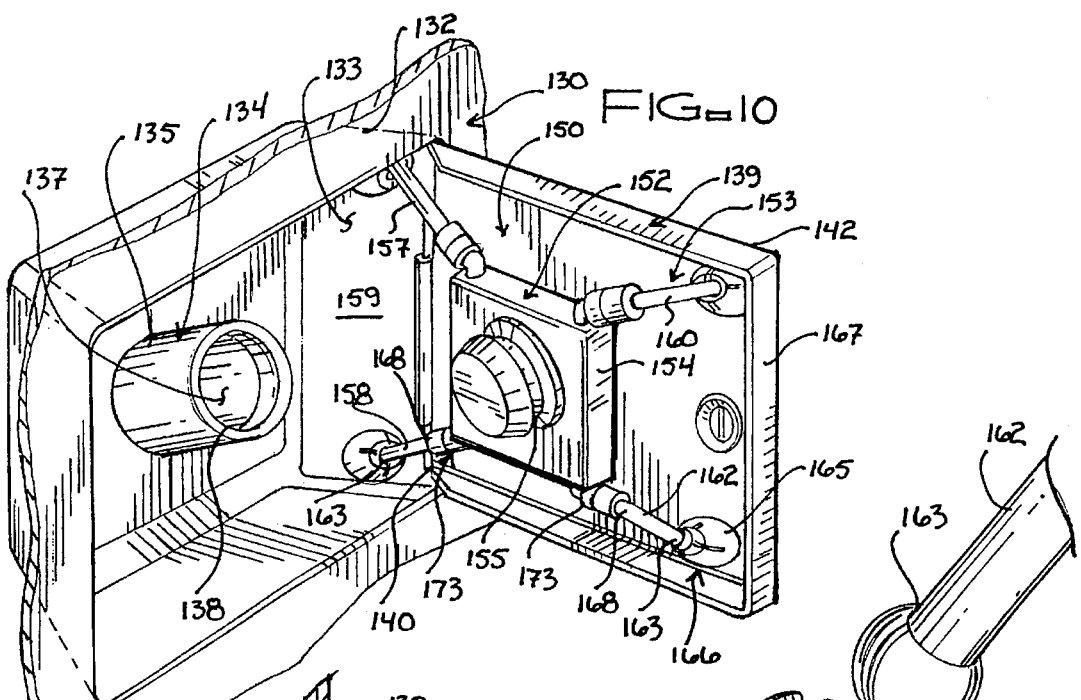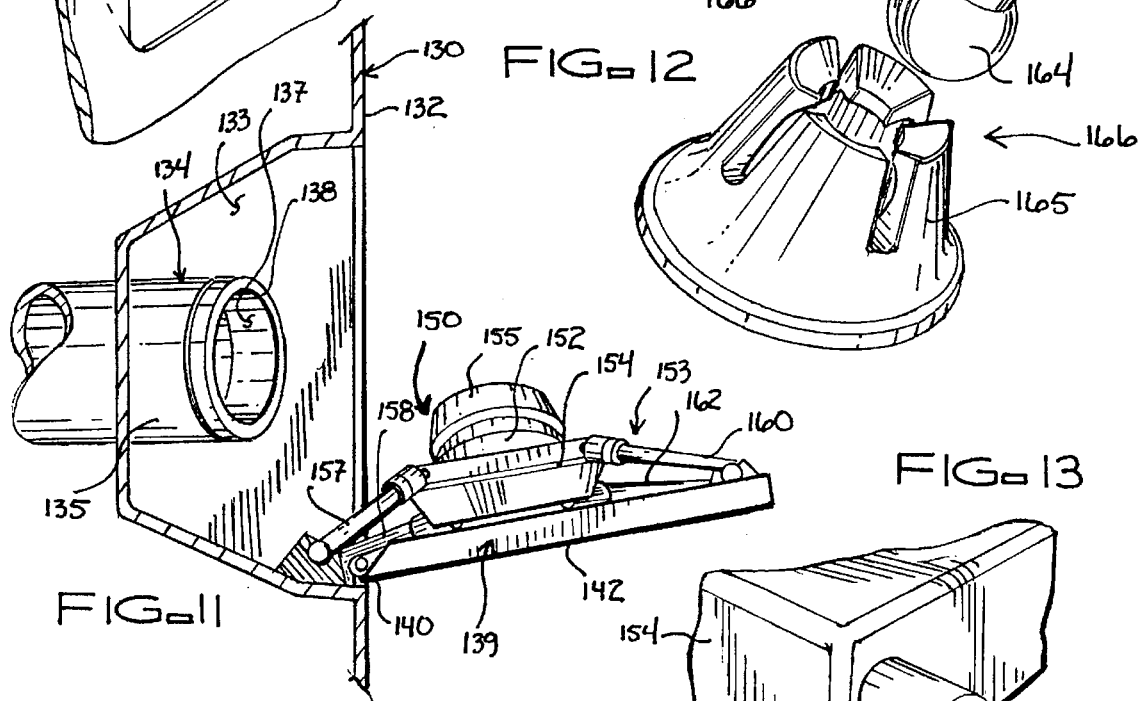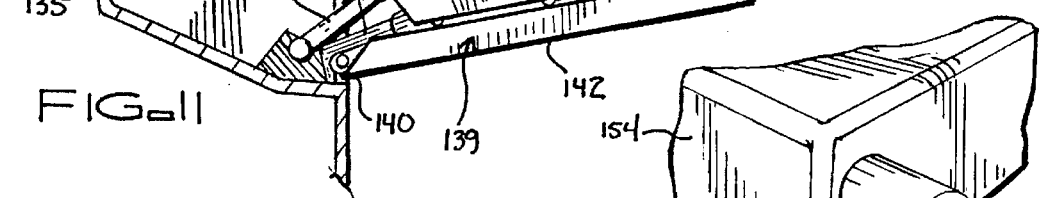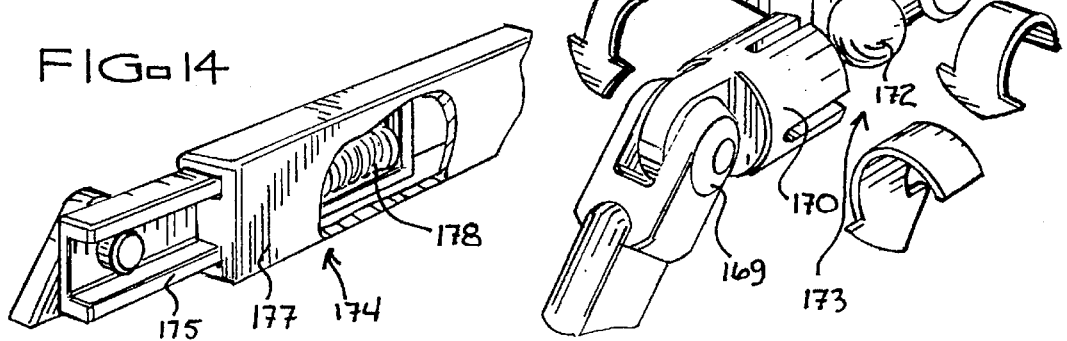

5,658,036

FUEL PORT SEALING APPARATUS

BACKGROUND OF THE INVENTION

1. Field of the Invention

This invention relates to vehicle accessories.

More particularly, the present invention relates to sealing apparatus.

In a further and more specific aspect, the instant invention concerns securing and sealing a fuel port.

2. Prior Art

Most likely every individual who has ever driven an automobile is familiar with filling a fuel tank of the automobile through a fuel port. This can be accomplished by utilizing a "full service" gas station at which an attendant will fill the tank. This presents no problems to the driver other than the much higher cost of the fuel. Generally, most individuals fill the tank themselves from self serve gas pumps obtaining fuel for a much lower price.

Self service can be inconvenient and can result in certain problems. In most automobiles the fuel port is recessed within a portion of the automobile, such as in a rear fender. The recessed fuel port is covered by a door to provide aerodynamic as well as esthetic characteristics. To access the fuel port, the door must be opened, then a gas cap must be removed. Sometimes the gas cap is coupled to the port by a tether which hold the gas cap after it has been removed from the port. In other instances the gas cap is loose when removed. Each type has inherent problems. If the cap is loose, it may be dropped, misplaced or lost. Often, an individual will set the cap on the automobile while filling the tank, forgetting it is there. The cap then becomes lost after driving away.

If the cap has a tether, it is generally in the way when trying to insert the fuel nozzle into the port. Both types require the access door to be opened first and closed last. There is no problem remembering to opening the access door, because it must be open to access the port. Remembering to close the door is often difficult. An individual's first thought after removing the nozzle is to avoid getting dripped on and to replace the nozzle on the pump. While most of the time the individual will remember to replace the gas cap, it is quite common to leave the access door open.

It would be highly advantageous, therefore, to remedy the foregoing and other deficiencies inherent in the prior art.

Accordingly, it is an object of the present invention to provide improvements in fuel port sealing devices.

Another object of the invention is to provide a fuel port sealing apparatus which is simple to use.

And another object of the invention is to provide an apparatus for sealing a fuel port which is manipulated with the access door.

Still another object of the immediate invention is the provision of an improved device for securing a fuel port.

Yet another object of the invention is to provide a fuel port sealing apparatus which will be positioned to seal the fuel port when the access door is closed.

Yet still another object of the invention is the provision of a fuel port sealing apparatus which is moved to an out-of-the-way position to facilitate fueling.

Still another object of the invention is not having to replace lost gas caps.

SUMMARY OF THE INVENTION

Briefly, to achieve the desired objects of the instant invention in accordance with a preferred embodiment thereof, provided is a fuel port sealing apparatus for closing and sealing a fuel port carried within a recessed chamber of a body of a vehicle. The fuel port sealing apparatus includes an access door having an edge hingedly coupled to the body adjacent the recessed chamber and movable between an open position and a closed position, and a sealing member coupled to the door, the sealing member positioned to engage the fuel port with the door in the closed position.

The sealing member includes an attachment portion attached to the access door and a sealing portion receivable within the fuel port.

Also provided is a locking mechanism for securing the door in the closed position, and thereby securing the sealing member in engagement with the fuel port. The locking mechanism is carried by the door and extends through the sealing member, the fuel port is engaged by the locking mechanism.

In another embodiment, the sealing member is coupled between the access door and the body in the recessed chamber by a link assembly. The link assembly includes a first link movably coupled to the seal member and movably coupled to the body in the recessed chamber, and a second link movably coupled to the seal member and movably coupled to the access door.

In yet another embodiment, the fuel port sealing apparatus includes an access door having an edge hingedly coupled to the body adjacent the recessed chamber and movable between an open position and a closed position, and a sealing member coupled to the access door and orientable to match the tilt of the fuel port as the access door is closed.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a perspective view of a fuel port sealing apparatus, constructed in accordance with the teachings of the instant invention, as it would appear installed proximate a fuel port and shown in the open position;

FIG. 2 is a broken away side view of a fuel port with the fuel port sealing apparatus installed thereby and in the open position;

FIG. 3 is a sectional side view of the fuel port as shown in FIGS. 1 and 2, illustrating the fuel port sealing apparatus in the closed position;

FIG. 4 is another embodiment of a fuel port sealing apparatus with an access door opening in a alternate direction;

FIG. 5 is a sectional side view of the fuel port with a fuel port sealing apparatus as shown in FIGS. 1–4, with the addition of a locking member;

FIG. 6 illustrates a further embodiment of a locking member for securing the fuel port sealing apparatus in sealing engagement with the fuel port;

FIG. 7 is a perspective view of a further embodiment of a fuel port sealing apparatus, constructed in accordance with the teachings of the present invention, as it would appear in an open position;

FIG. 8 is a side view of the fuel port sealing apparatus of FIG. 7;

FIG. 9 is a plan view of the fuel port sealing apparatus of FIGS. 7 and 8;

FIG. 10 is a perspective view of yet another embodiment of a fuel port sealing apparatus, constructed in accordance with the teachings of the present invention, as it would appear in an open position;

FIG. 11 is a top view of the apparatus of FIG. 10;

FIG. 12 is an enlarged perspective view of a joint;

FIG. 13 is an enlarged perspective view of a further embodiment of a joint; and

FIG. 14 is an enlarged perspective view of another embodiment of a link.

DETAILED DESCRIPTION OF THE PREFERRED EMBODIMENT

Turning now to the drawings in which like reference characters indicate corresponding elements throughout the several views. Attention is first directed to FIG. 1 which illustrates a portion of a body 10 of an automobile (not shown). Body 10 includes an outer surface 12 and a recessed chamber 13 containing a fuel port 14. Fuel port 14 includes a tubular member 15 terminating in an opening 17 defined by a rim 18. The fuel tank (not shown) of a vehicle, such as an automobile, is filled through fuel port 14 which is recessed with respect to outer surface 12 of body 10. Fuel port 14 is contained within recessed chamber 13 to maintain the aerodynamic integrity and the aesthetic appeal of body 10. A lower edge 19 of an access door 20 is hingedly coupled to body 10 and movable between an open position and a closed position, in the direction indicated by double arrowed arcuate line A. In the open position, access door 20 is pivoted downward away from recessed chamber 13, allowing access to fuel port 14. In the closed position, access door 20 closes recessed chamber 13 and presents a surface 22 generally flush with outer surface 12 of body 10. In this specific instance, opening 17 of fuel port 14 is generally parallel with access door 20 when in the closed position.

Set forth for purposes of orientation and reference in connection with the ensuing detailed description of the present invention, the foregoing brief description of fuel port 14 is intended to be generally representative of conventional fuel ports found on commercially available automobiles. Details not specifically illustrated and described will be readily understood and appreciated by those skilled in the art.

Still referring to FIG. 1, with additional reference to FIG. 2, a fuel port sealing apparatus constructed in accordance with the teachings of the present invention and generally designated 30 is illustrated. Fuel port sealing apparatus 30 includes a sealing member 32 consisting of an attachment portion 33 and a sealing portion 34 extending therefrom. Attachment portion 33 has an outer surface 35 affixed to access door 20, and an inner surface 37 from which sealing portion 34 extends. Sealing portion 34 is preferably of a smaller diameter than attachment portion 33. Attachment portion 33 is preferable of a larger diameter than rim 18, while sealing portion 34 is sized to be received within opening 17. Sealing portion 34 is generally cylindrical, with an outer surface 39 configured to engage an inner surface 40 of rim 18.

Turning now to FIG. 3, access door 20 is shown in the closed position. When access door 20 is in the closed position, sealing member 32 is positioned to engage fuel port 14. FIGS. 1 and 2 illustrated access door 20 open, and fuel port sealing apparatus 30 in an out-of-the-way location, allowing unobstructed access to fuel port 14. FIG. 3 illustrates access door 20 closed and fuel port sealing apparatus 30 sealing opening 17 of fuel port 14. As mentioned previously, sealing portion 34 is sized to tightly engage inner surface of rim 18, effectively sealing opening 17. Fuel port sealing apparatus 30, in this embodiment is preferably fabricated entirely of an elastomaric material such as rubber. This permits a tight sealing engagement between sealing portion 34 and rim 18. One skilled in the art will understand that many other materials may be used. For example, sealing member 32 may be fabricated entirely of metal with a seal (not illustrated) carried by sealing portion 34 to engage rim 18. In this instance, the seal may be an O-ring carried around outer surface 39 of sealing portion 34.

Since sealing member 30 is fixed to access door 20, movement of access door 20 results in a corresponding movement of sealing member 30. When opening 17 of fuel port 14 is substantially parallel with access door 20, sealing portion 34 will readily enter therein.

Referring now to FIG. 4, an alternate access door configuration is illustrated. In this embodiment, an access door 42 has a side edge 43 hingedly coupled to a body 44, to one side of a recessed chamber 45. This embodiment is intended to illustrate that the direction of door movement may vary with the type and model of the vehicle. Fuel port sealing apparatus 30 may be adjusted to conform to substantially any of various shapes and configurations of recessed chambers and access doors. Subsequent embodiments will provide disclosure for even more variations where necessary to conform to different angles and locations of the fuel port within the recessed chamber.

Turning now to FIG. 5, a lock mechanism 47 may be employed in conjunction with fuel port sealing apparatus 30 to securely retain fuel port sealing apparatus 30 in opening 17 and to retain access door 20 in the closed position. Locking mechanism 47 includes a key receiving end 48 and a securing end 49. Lock mechanism 47 extends through access door 20, with securing end 49 extending from sealing portion 34 and key receiving end 48 extending from access door 20. In a locked configuration, bolts 50 extend perpendicularly from securing end 49 and engage rim 18, preventing withdrawal of sealing portion 34 from opening 17.

FIG. 6 illustrates yet another embodiment of a locking mechanism, generally designated 52. Locking mechanism 52 extends through access door 20 and includes a key receiving end 53 outside of recessed chamber 13, and a securing end 54 extending from access door 20 into recessed chamber 13. A bolt 55 is movable between an unlocked position, and a locked position by the use of a key 57 in a conventional manner. In the locked position bolt 55 is received within a notch 58 formed in body 10, securely retaining access door 20 in the closed position.

Referring now to FIG. 7, a body 60 generally similar to body 10 is illustrated and includes an outer surface 62 and a recessed chamber 63 containing a fuel port 64. Fuel port 64 includes a tubular member 65 terminating in an opening 67 defined by a rim 68. An access door 69 is hingedly coupled to body 60 by a lower edge 70 and movable between an open position and a closed position. In the open position, access door 69 is pivoted downward away from recessed chamber 63, allowing access to fuel port 64. In the closed position, access door 69 closes recessed chamber 63 and presents a surface 72 generally flush with outer surface 62 of body 60. Fuel port 64 in this configuration is tilted in an upward direction, resulting in opening 67 being at an angle to access door 69 in the closed position. It is the angle of opening 67 with respect to access door 69 which requires a modification of the fuel port sealing apparatus.

Still referring to FIG. 7, with additional reference to FIGS. 8 and 9, another embodiment of a fuel port sealing apparatus generally designated 80 is illustrated mounted to body 60. Fuel port sealing apparatus 80 includes a sealing member 82 coupled between access door 69 and recessed chamber 63 by a linkage assembly 83. Sealing member 82 consists of an attachment portion 84 and a sealing portion 85 extending therefrom. Attachment portion 84 is generally square and includes an inner surface 87, an outer surface 88, has opposing side edges 89 and 90, a top edge 92 and a bottom edge 93. Sealing portion 85 extends from inner surface 87 and is preferably of a smaller diameter than attachment portion 84. Attachment portion 84 is preferable of a larger diameter than rim 68, while sealing portion 85 is sized to be received within opening 67. Sealing portion 85 is generally cylindrical, with an outer surface 95 configured to engage an inner surface 97 of rim 68.

Linkage assembly 83 includes a pair of links 98 and 99 coupled between sealing member 82 and a bottom 100 of recessed chamber 63, and a pair of links 102 and 103 coupled between sealing member 82 and access door 69. Links 98 and 99 are pivotally coupled by ends 104 and 105 to attachment portion 84 at side edges 89 and 90, respectively, proximate bottom edge 93, and by ends 107 and 108 to opposite sides of bottom 100 of recessed chamber 69. In this embodiment, ends 107 and 108 are coupled to brackets 109 and 110 extending from bottom 100. Ends 98 and 99, and ends 104 and 105 are each pivotally coupled by joints 112 each consisting of a pivot pin 113 extending through the respective ends, and through attachment portion 84 and brackets 109 and 110.

Links 102 and 103 are pivotally coupled by ends 114 and 115 to attachment portion 84 at side edges 89 and 90, respectively, proximate top edge 92, and by ends 117 and 118 to opposite sides of an inner surface 119 of access door 69. In this embodiment, ends 114 and 115 are coupled to brackets 120 and 122 extending from inner surface 119. Ends 114 and 115, and ends 117 and 118 are each pivotally coupled by joints 123 consisting of a pivot pin 124 extending through the respective ends, and attachment member and brackets respectively.

Referring specifically to FIG. 8, access door 69 is shown in the open position and in the closed position. The elements in the open position are differentiated from the elements in the closed position by the use of a prime in connection with the appropriate reference character. Links 98, 99 and links 102, 103 cooperate to pull sealing member 82 toward access door 69 when access door 69 is opened, and pushed sealing member 82 away from access door 69 as access door 69 is closed. The result is a toggle action which forces sealing portion 85 into opening 67 when access door 69 is closed, and pulls sealing member 82 out of the way for fueling when access door 69 is open. The links permit sealing member 82 to be angled with respect to access door 69, to match the angle of opening 67. In this instance, a vertical tilt of sealing member 82 is required when access door is closed. In other words, outer surface 88 of attachment portion 87 is angled such that upper edge 92 is spaced further from access door 69 than is bottom edge 93 when access door is in the closed position.

One skilled in the art will understand that changes to the lengths of the links and the positioning of the point of attachment of the ends will allow fuel port sealing apparatus to be employed on vehicles with fuel ports having different angles. By changing the length and position of the links, the tilt of the sealing member can be adjusted to match the tilt of the opening of the fuel port.

Referring now to FIG. 10 and 11, a body 130 generally similar to body 69 is illustrated and includes an outer surface 132 and a recessed chamber 133 containing a fuel port 134. Fuel port 134 includes a tubular member 135 terminating in an opening 137 defined by a rim 138. An access door 139 is hingedly coupled to body 130 by a side edge 140 and movable between an open position and a closed position. In the open position, access door 139 is pivoted horizontally away from recessed chamber 133, allowing access to fuel port 134. In the closed position, access door 139 closes recessed chamber 133 and presents a surface 142 generally flush with outer surface 132 of body 130. Fuel port 134 in this configuration, as in the previous embodiment, is tilted in an upward direction, resulting in opening 137 being at an angle to access door 139 in the closed position. It is the upward angle of opening 137 with respect to access door 139 and the horizontal movement of access door 139, which requires a modification of the fuel port sealing apparatus.

Still referring to FIGS. 10 and 11, yet another embodiment of a fuel port sealing apparatus generally designated 150 is illustrated. Fuel port sealing apparatus 150 is generally identical to fuel port sealing apparatus 80 including a sealing member 152 coupled between access door 139 and recessed chamber 133 by a linkage assembly 153. Sealing member 152 consists of an attachment portion 154 and a sealing portion 155 extending therefrom.

Linkage assembly 153 is generally identical to linkage assembly 83, including a pair of links 157 and 158 coupled between attachment portion 154 and a side 159 of recessed chamber 133, and a pair of links 160 and 162 coupled between attachment portion 154 and access door 139. With additional reference to FIG. 12, an end 163 of each of links 157, 158, 160 and 162 terminates in a ball 164 which is received by a socket 165 to form a joint 166. Sockets 165 are coupled to side 159 to receive balls 164 of links 157 and 158 and are coupled to the inner surface of access door 139 proximate a side 167 opposite side edge 140 to receive balls 164 of links 160 and 162.

Still referring to FIGS. 10 and 11, and with additional reference to FIG. 13, an end 168 of each of links 157, 158, 160 and 162 terminates in a universal joint 169 and socket 170. A ball 172 extends from each corner of attachment portion 154 to be received by sockets 170 of links 157, 158, 160 and 162, each forming a joint 173. One skilled in the art will understand that various types of joints permitting different ranges of motion may be employed. Two different joints are employed in this embodiment to illustrate that different joints may be used together. In this manner, sealing member 152 is suspended between access door 139 and recessed chamber 133 by a plurality of links which permit both vertical and horizontal tilting thereof. This movement of sealing member 152 is provided in order to insert sealing portion 155 into opening 137 as access door 139 is closed and to match the angle of opening 137 when access door 139 is in the closed position.

Turning now to FIG. 14, an additional feature, which may be added to the fuel port sealing apparatus if required to further aid in matching angles and depth of opening 137 within recessed chamber 133, is an expandable link 174. Expandable link 174 includes a first section 175 telescopingly received within a second section 177, and biased in an expanded direction by a compression spring 178. In certain fuel port configurations, expandable link 174 may be required to insert sealing portion 155 into opening 137.

One skilled in the art will understand that different features of each of the foregoing embodiments may be combined to meet the needs of different configurations of the various fuel ports that are in use.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A fuel port sealing apparatus for closing and sealing a fuel port carried within a recessed chamber of a body of a vehicle, the sealing apparatus comprising:

an access door having an edge hingedly coupled to the body adjacent the recessed chamber and movable between an open position and a closed position; and a sealing member having a sealing portion receivable within the fuel port with the door in the closed position and an attachment portion attached to said access door by a link assembly including a first link movably coupled to the attachment portion and movably coupled to the body in the recessed chamber, and a second link movably coupled to the attachment portion and movably coupled to the access door.

2. A fuel port sealing apparatus as claimed in claim 1 further comprising a locking mechanism for securing the door in the closed position, and thereby securing the sealing member in engagement with the fuel port.

3. A fuel port sealing apparatus as claimed in claim 2 wherein the locking mechanism is carried by the door and extends through the sealing member, the fuel port is engaged by the locking mechanism.

4. A fuel port sealing apparatus as claimed in claim 1 wherein the first link and the second link are each coupled to the seal member by a ball joint.

5. A fuel port sealing apparatus as claimed in claim 1 wherein the seal member is toggled toward the access door as the access door moves toward the open position, and is toggled away from the access door as the access door is moved toward the closed position.

6. A fuel port sealing apparatus for closing and sealing a fuel port carried within a recessed chamber of a body of a vehicle, the sealing apparatus comprising:

an access door having an edge hingedly coupled to the body adjacent the recessed chamber and movable between an open position and a closed position; and a sealing member coupled to the access door by a first link movably coupled to the seal member and movably coupled to the body in the recessed chamber, and a second link movably coupled to the seal member and movably coupled to the access door, the seal member and orientable to match the tilt of the fuel port as the access door is closed.

7. A fuel port sealing apparatus as claimed in claim 6 wherein the seal member is toggled toward the access door as the access door moves toward the open position, and is toggled away from the access door as the access door is moved toward the closed position.

8. A fuel port sealing apparatus as claimed in claim 6 wherein the hinge coupling is oriented so that the sealing member is tiltable in a vertical direction as the access door is moved to the closed position.

9. A fuel port sealing apparatus as claimed in claim 6 wherein the hinge coupling is oriented so that the sealing member is tiltable in a horizontal direction as the access door is moved to the closed position.

* * * * *